United States Patent
Zheng et al.

(10) Patent No.: US 9,227,734 B2
(45) Date of Patent: Jan. 5, 2016

(54) SECONDARY LOAD PATH FOR GAS TURBINE ENGINE

(75) Inventors: Zhijun Zheng, Avon, CT (US); David F. Sandy, Milford, CT (US)

(73) Assignee: United Technologies Corporation, Hartford, CT (US)

(*) Notice: Subject to any disclaimer, the term of this patent is extended or adjusted under 35 U.S.C. 154(b) by 544 days.

(21) Appl. No.: 13/600,645

(22) Filed: Aug. 31, 2012

(65) Prior Publication Data

US 2014/0061426 A1 Mar. 6, 2014

(51) Int. Cl.
*B64D 27/00* (2006.01)
*B64D 27/26* (2006.01)

(52) U.S. Cl.
CPC .......... *B64D 27/26* (2013.01); *B64D 2027/266* (2013.01); *Y02T 50/44* (2013.01)

(58) Field of Classification Search
CPC ............. B64D 27/26; B64D 2027/262; B64D 2027/266; F02C 7/06; F02C 7/20; F05D 2240/90; F05D 2260/30; F05D 2260/56; F01D 25/28; F01D 25/24
USPC ......... 248/554, 555, 556, 557, 548, 550, 900; 248/637, 645, 646, 674, 675, 676, 678; 244/54; 60/797, 796; 415/213.1
See application file for complete search history.

(56) References Cited

U.S. PATENT DOCUMENTS

| | | | |
|---|---|---|---|
| 5,064,144 A * | 11/1991 | Chee | 244/54 |
| 5,078,342 A * | 1/1992 | Langley et al. | 244/54 |
| 5,238,206 A * | 8/1993 | Pachomoff | 244/54 |
| 5,275,357 A | 1/1994 | Seelen et al. | |
| 5,277,382 A | 1/1994 | Seelen et al. | |
| 5,303,880 A | 4/1994 | Cencula et al. | |
| 5,320,307 A | 6/1994 | Spofford et al. | |
| 5,927,644 A | 7/1999 | Ellis et al. | |
| 6,296,203 B1 | 10/2001 | Manteiga et al. | |
| 6,309,131 B1 | 10/2001 | Dawson | |
| 6,330,995 B1 * | 12/2001 | Mangeiga et al. | 248/554 |
| 6,474,596 B1 * | 11/2002 | Cousin et al. | 244/54 |
| 7,527,220 B2 * | 5/2009 | Dron | 244/54 |
| 7,909,285 B2 * | 3/2011 | Dron et al. | 244/54 |
| 8,074,923 B2 | 12/2011 | Foster | |

(Continued)

OTHER PUBLICATIONS

International Search Report & Written Opinion for International Application No. PCT/US2013/052833 mailed on May 9, 2014.

(Continued)

*Primary Examiner* — Terrell McKinnon
*Assistant Examiner* — Michael McDuffie
(74) *Attorney, Agent, or Firm* — Carlson, Gaskey & Olds, P.C.

(57) ABSTRACT

A waiting link to support an engine on an aircraft includes a body portion including a first body portion opening, a second body portion opening, and a space therebetween. A first bearing is received in the first body portion opening and moveable in a generally vertical direction. A second bearing is received in the second body portion opening. The first and second bearings include a first and second bearing opening, respectively, that receives a first and second attachment member, respectively, that secures the body portion to a first and second structure, respectively. A cam is located in the space. The cam is pivotable between a first position and a second position. The waiting link does not provide a load path when the cam is in the first position, and when a primary load path fails, the waiting link provides the load path when the cam is in the second position.

20 Claims, 4 Drawing Sheets

(56) References Cited

U.S. PATENT DOCUMENTS

| | | | |
|---|---|---|---|
| 8,104,736 B2 * | 1/2012 | Callaghan | 248/557 |
| 8,561,942 B2 * | 10/2013 | Zheng et al. | 244/54 |
| 8,905,368 B2 * | 12/2014 | Zameroski | 248/554 |
| 2007/0138337 A1 | 6/2007 | Audart-Noel et al. | |
| 2008/0236136 A1 * | 10/2008 | Loffredo | 60/201 |
| 2009/0266933 A1 | 10/2009 | Foster | |
| 2010/0181419 A1 * | 7/2010 | Haramburu et al. | 244/54 |
| 2011/0064343 A1 * | 3/2011 | Larrochelle et al. | 384/206 |

OTHER PUBLICATIONS

International Preliminary Report on Patentability for International Application No. PCT/US 2013/052833 mailed Mar. 12, 2015.
European Search Report for EP Application No. 13837010.1 dated Sep. 9, 2015.

* cited by examiner

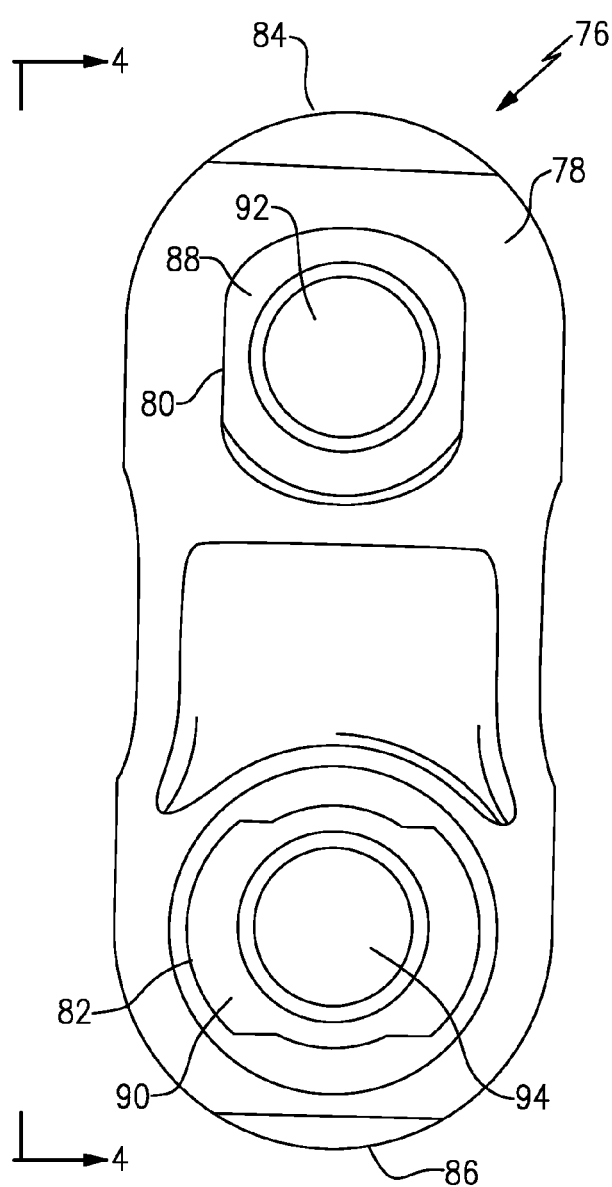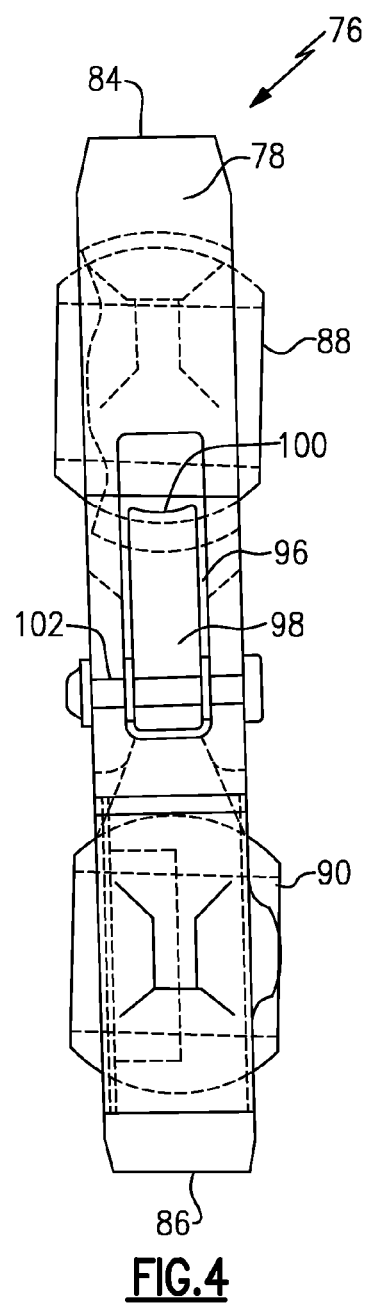
FIG.3
FIG.4

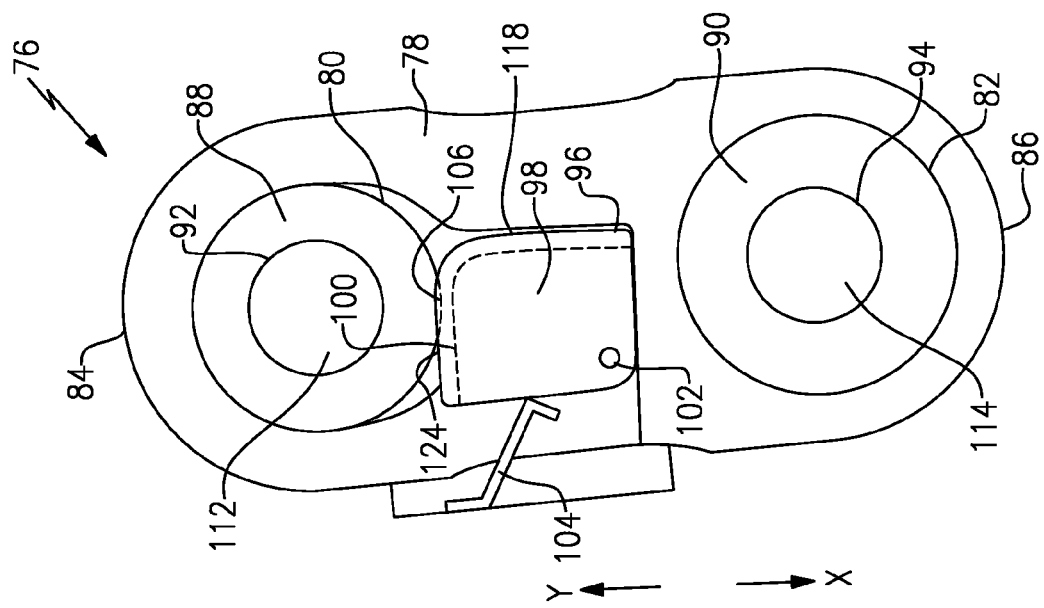
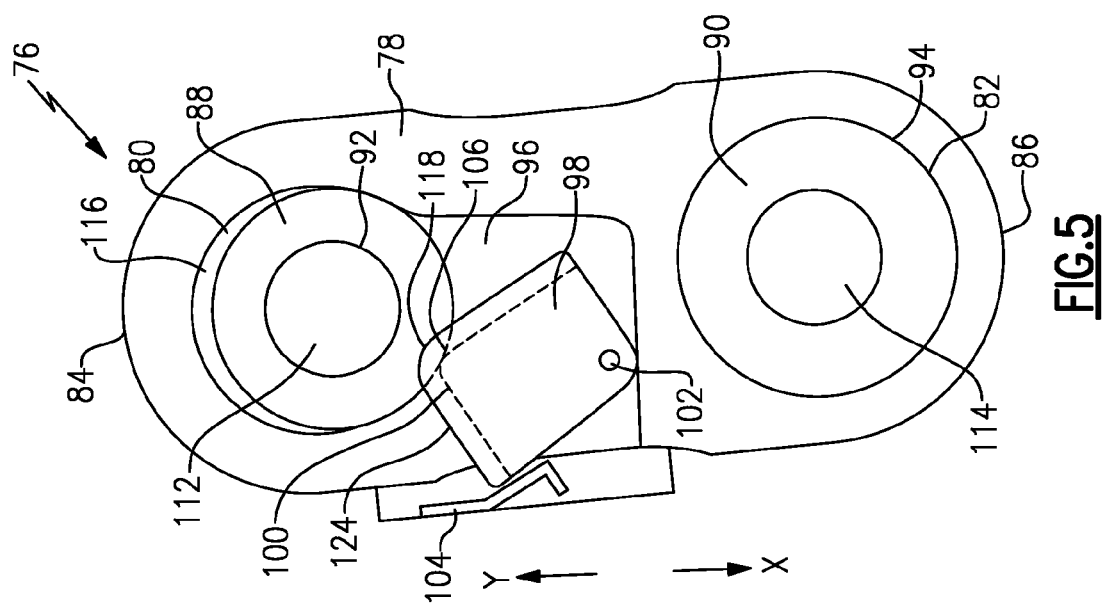

SECONDARY LOAD PATH FOR GAS TURBINE ENGINE

BACKGROUND OF THE INVENTION

A gas turbine engine is generally mounted to a pylon that is attached to an aircraft frame of an aircraft. Engine mount systems incorporate a backup system that provides a redundant secondary load path if a primary load path fails. The secondary load path is not engaged under normal load conditions or limit maneuver load conditions. In one example, the backup system includes a waiting link having a gap provided at the bottom of the waiting link that prevents engagement of the secondary load path.

For an aft engine mount, the waiting link is positioned between two primary links. In one example, the waiting link is located between the V3 and V2S4 links. If one or both of the primary links fails, movement of the gas turbine engine closes the gap at the bottom of the waiting link to engage the secondary load path. The engagement of the waiting link is not detected until the aircraft is visually inspected When the waiting link is engaged, vertical loads will move the gas turbine engine upwardly or downwardly, and a substantial vertical load can bottom out a ball bearing at either a top location or a bottom location of the waiting link. The kinetic energy associated with this movement could result in an impact force that is higher than the design load. A dynamic amplification factor is applied to the static load, as well as the fatigue spectrum, to ensure the lug joint has adequate capability.

SUMMARY OF THE INVENTION

A waiting link to support an engine on an aircraft according to an exemplary embodiment of this disclosure, among other possible things, includes a body portion including a first body portion opening, a second body portion opening, and a space located therebetween. The first opening is in communication with the space. A first bearing is received in the first body portion opening and moveable in a generally vertical direction. The first bearing includes a first bearing opening that receives a first attachment member that secures the body portion to a first structure. A second bearing is received in the second body portion opening. The second bearing includes a second bearing opening that receives a second attachment member that secures the body portion to a second structure. A cam is located in the space. The cam is pivotable between a first position and a second position. The waiting link does not provide a load path when the cam is in the first position. When a primary load path fails, the waiting link provides the load path when the cam is in the second position.

In a further embodiment of any of the foregoing waiting links, the first structure is a pylon.

In a further embodiment of any of the foregoing waiting links, the second structure is a fan containment case of an engine.

In a further embodiment of any of the foregoing waiting links, the first bearing is a first ball bearing and the second bearing is a second ball bearing.

In a further embodiment of any of the foregoing waiting links, the first bearing is an upper bearing and the second bearing is a lower bearing.

In a further embodiment of any of the foregoing waiting links, the first opening and the space share a common space.

In a further embodiment of any of the foregoing waiting links, the cam is substantially rectangular and pivots about a pivot pin.

In a further embodiment of any of the foregoing waiting links, the waiting link does not carry a load of an aircraft when the cam is in the first position.

In a further embodiment of any of the foregoing waiting links, a gap is defined between a first ball bearing and the cam when the cam is in the first position.

In a further embodiment of any of the foregoing waiting links, when the cam pivots about a pivot to the second position, the gap is eliminated, and vertical movement of the engine will not produce impact load.

In a further embodiment of any of the foregoing waiting links, a resilient member biases the cam to the second position.

In a further embodiment of any of the foregoing waiting links, when the first bearing moves upwardly, the resilient member biases the cam to the second position.

A waiting link to support an engine on an aircraft according to an exemplary embodiment of this disclosure, among other possible things, includes a body portion including a first body portion opening, a second body portion opening, and a space located therebetween. The first opening is in communication with the space. A first ball bearing is received in the first body portion opening and moveable in a generally vertical direction. The first ball bearing includes a first ball bearing opening that receives a first attachment member that secures the body portion to a pylon. The first ball bearing is an upper bearing. A second ball bearing is received in the second body portion opening. The second ball bearing includes a second ball bearing opening that receives a second attachment member that secures the body portion to a fan containment case of an engine. The second ball bearing is a lower bearing. A cam is located in the space. The cam is pivotable between a first position and a second position. The waiting link does not provide a load path and does not carry a load of an aircraft when the cam is in the first position, and when a primary load path fails, the waiting link provides the load path when the cam is in the second position. A resilient member biases the cam to the second position.

In a further embodiment of any of the foregoing waiting links, the first opening and the space share a common space.

In a further embodiment of any of the foregoing waiting links, the cam is substantially rectangular and pivots about a pivot pin.

In a further embodiment of any of the foregoing waiting links, a gap is defined between a first ball bearing and the cam when the cam is in the first position.

In a further embodiment of any of the foregoing waiting links, when the cam pivots about a pivot to the second position, the gap is eliminated, and vertical movement of the engine will not produce impact load.

In a further embodiment of any of the foregoing waiting links, when the first bearing moves upwardly, the resilient member biases the cam to the second position.

These and other features of the present invention can be best understood from the following specification and drawings, the following of which is a brief description.

BRIEF DESCRIPTION OF THE DRAWINGS

FIG. 3 illustrates a front view of a waiting link of the attachment mechanism;

FIG. 4 illustrate a cross sectional side view of the waiting link;

FIG. 5 illustrate a cross sectional front view of the waiting link when a secondary load path is not engaged; and FIG. 6 illustrate a cross sectional front view of the waiting link when the secondary load path is engaged.

DETAILED DESCRIPTION OF THE PREFERRED EMBODIMENTS

Figure 1:
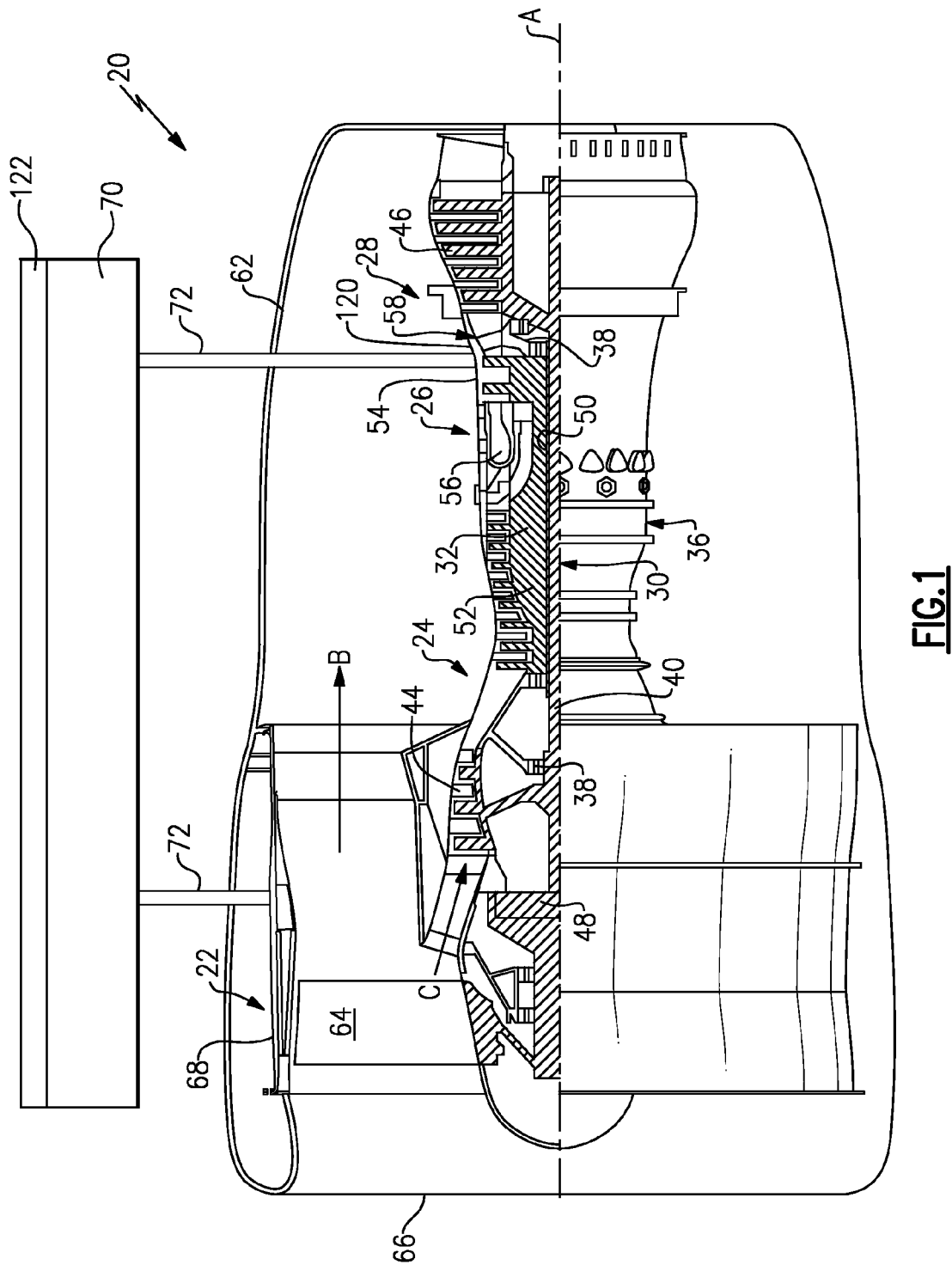
FIG. 1 illustrates a schematic view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features.

Although depicted as a turbofan gas turbine engine in the disclosed non-limiting embodiment, it should be understood that the concepts described herein are not limited to use with turbofans as the teachings may be applied to other types of turbine engines including three-spool or geared turbofan architectures.

The fan section 22 drives air along a bypass flowpath B while the compressor section 24 drives air along a core flowpath C for compression and communication into the combustor section 26 then expansion through the turbine section 28.

The fan section 22 is disposed within a nacelle 62 and includes a plurality of fan blades 64. The nacelle 62 encases the components of the gas turbine engine 20 and defines an inlet 66 for incoming airflow. A fan containment case 68 is disposed within the nacelle 62 and proximate to the fan blades 64 within the fan section 22.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and a high pressure turbine 54.

A combustor 56 is arranged between the high pressure compressor 52 and the high pressure turbine 54.

A mid-turbine frame 58 of the engine static structure 36 is arranged generally between the high pressure turbine 54 and the low pressure turbine 46. The mid-turbine frame 58 further supports bearing systems 38 in the turbine section 28.

The inner shaft 40 and the outer shaft 50 are concentric and rotate via bearing systems 38 about the engine central longitudinal axis A, which is collinear with their longitudinal axes.

The core airflow C is compressed by the low pressure compressor 44, then the high pressure compressor 52, mixed and burned with fuel in the combustor 56, then expanded over the high pressure turbine 54 and low pressure turbine 46. The mid-turbine frame 58 includes airfoils 60 which are in the core airflow path. The turbines 46, 54 rotationally drive the respective low speed spool 30 and high speed spool 32 in response to the expansion.

The gas turbine engine 20 is in one example a high-bypass geared aircraft engine. In a further example, the gas turbine engine 20 bypass ratio is greater than about six (6:1) with an example embodiment being greater than ten (10:1). The geared architecture 48 is an epicyclic gear train (such as a planetary gear system or other gear system) with a gear reduction ratio of greater than about 2.3 (2.3:1). The low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle.

In one disclosed embodiment, the gas turbine engine 20 bypass ratio is greater than about ten (10:1), and the fan diameter is significantly larger than that of the low pressure compressor 44. The low pressure turbine 46 has a pressure ratio that is greater than about five (5:1). The geared architecture 48 may be an epicycle gear train, such as a planetary gear system or other gear system, with a gear reduction ratio of greater than about 2.5 (2.5:1). It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet. The flight condition of 0.8 Mach and 35,000 feet, with the engine at its best fuel consumption, also known as bucket cruise Thrust Specific Fuel Consumption ("TSFC"). TSFC is the industry standard parameter of lbm of fuel being burned divided by lbf of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.45.

"Low corrected fan tip speed" is the actual fan tip speed in feet per second divided by an industry standard temperature correction of $[(\text{Tram} \,^\circ \text{R})/518.7)^{0.5}]$. The "Low corrected fan tip speed" as disclosed herein according to one non-limiting embodiment is less than about 1150 feet per second (351 meters per second).

Figure 2:
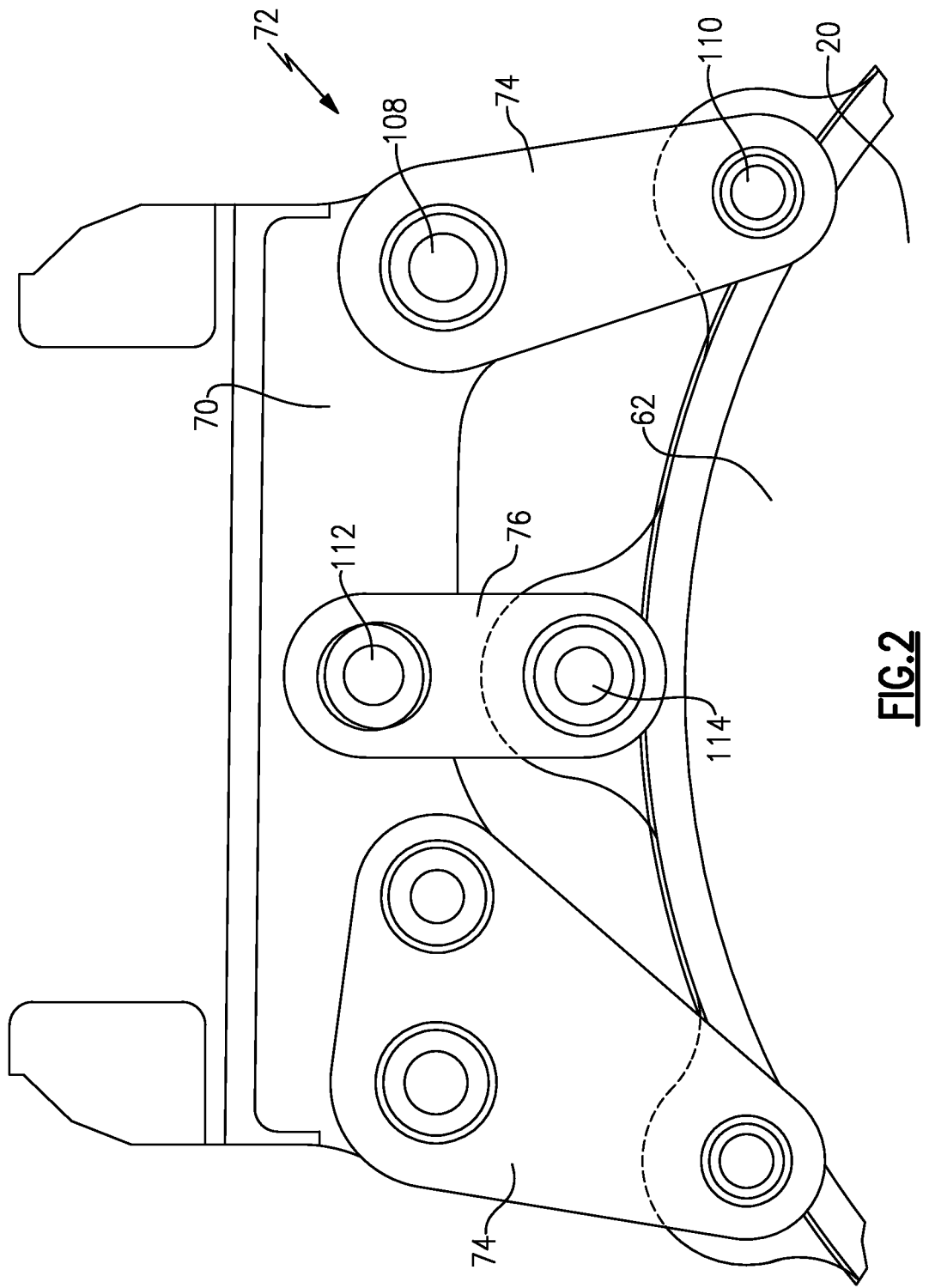
FIG. 2 illustrates an attachment mechanism of the gas turbine engine.

As shown in FIG. 2, an attachment mechanism 72 (shown schematically) attaches the gas turbine engine 20 to a pylon 70 mounted to an aircraft frame 122 of an aircraft. In one example, the attachment mechanism 72 secures a turbine exhaust case 120 to the pylon 70. The attachment mechanism 72 can also attach the fan containment case 68 to the pylon 70.

The attachment mechanism 72 includes primary links 74 that retain the gas turbine engine 20 to the pylon 70. A first attachment member 108 secures each of the primary links 74 to the pylon 70, and a second attachment member 110 secures each of the primary links 74 to the turbine exhaust case 120.

The attachment mechanism 72 also includes a waiting link 76. A first attachment member 112 secures the waiting link 76 to the pylon 70, and a second attachment member 114 secures the waiting link 76 to the turbine exhaust case 120. The waiting link 76 has a lower dynamic amplification factor that allows for a smaller waiting link 76, improving aero performance and providing a weight savings. Under normal operation, the waiting link 76 is not engaged.

FIGS. 3 and 4 illustrate the waiting link 76. The waiting link 76 includes an elongated body portion 78. In one example, the elongated body portion 78 is rectangular in shape. In one example, the elongated body portion 78 includes curved end regions 84 and 86.

The waiting link 76 includes a first opening 80 and a second opening 82. In one example, when the waiting link 76 is assembled and attached to the pylon 70 and the turbine exhaust case 120, the first opening 80 is an upper opening, and the second opening 82 is a lower opening. When assembled, the end region 84 is an upper region, and the end region 86 is a lower region.

A first ball bearing 88 is received in the first opening 80, and a second ball bearing 90 is received in the second opening 82. The first ball bearing 88 can move in a generally vertical direction within the first opening 80. The first ball bearing 88 and the second ball bearing 90 define a first opening 92 and a second opening 94, respectively. The first attachment member 112 is received in the first opening 80 of the first ball bearing 88, and the second attachment member 114 is received in the second opening 82 of the second ball bearing 90, securing the waiting link 76 to the pylon 70 and the turbine exhaust case 120, respectively. The waiting link 76 also includes a space 96 located between the openings 80 and 82 that receives a cam 98. The space 96 and the first opening 80 share a common space and are in special communication with each other.

A cam 98 located within the space 96 is pivotably mounted to the elongated body portion 78 of the waiting link 76 about a pivot pin 102. In one example, the cam 98 is substantially rectangular in shape and includes a curved groove 100 that receives a portion of the first ball bearing 88. The cam 98 also includes a curved surface 118 within the curved groove 100 that slides against the first ball bearing 88 as the cam 98 pivots.

A gap 116 in the upper portion of the waiting link 76 prevents the waiting link 76 from becoming engaged during normal load conditions. In one example, the gap 116 is located between the first ball bearing 88 and the cam 98. In another example, the gap 116 is located above the first ball bearing 88. The size of the gap 116 is determined by a plurality of factors, including tolerance, thermal conditions and mechanical load. This ensures that the waiting link 76 does not carry the load under a normal load or under a limit maneuver load.

As shown in FIG. 5, under normal loads and normal conditions, the waiting link 76 is not engaged, and the cam 98 is in a first position. The waiting link 76 does not carry a load of the gas turbine engine 20. A portion of a side surface of the first ball bearing 88 rests on the curved surface 118 of the cam 98 within the curved groove 100. The first ball bearing 88 and the cam 98 contact at a contact surface 106. The cam 98 compresses a resilient member 104, which is spring loaded to assist with rotation of the cam 98 when the secondary load path needs to be engaged. In one example, the resilient member 104 is a leaf spring.

If one of the primary links 74 fails, the gas turbine engine 20 drops relative to the pylon 70 in a substantially downwardly direction X. In response to the gravity of the gas turbine engine 20, the waiting link 76 becomes engaged.

As shown in FIG. 6, this movement causes the first ball bearing 88 to move in an upwardly direction Y within the first opening 80, and the first ball bearing 88 disengages from the cam 98. The spring force biases the cam 98 away from the resilient member 104, and the cam 98 pivots about the pivot pin 102 to a second position. As the cam 98 pivots to the second position, the first ball bearing 88 moves upwardly within the opening 80. The upper surface 124 of the cam 98 contacts a bottom surface of the first ball bearing 88 at the contact surface 106. When the cam 98 is in the second position, the gap 116 is eliminated. Therefore, vertical movement of the gas turbine engine 20 will not produce an impact load.

Once the waiting link 76 is engaged, the gap 116 is eliminated, and the cam 98 and the first ball bearing 88 provide a rigid structure so that the waiting link 76 provides a backup secondary load path. The dynamic amplification factor is eliminated, reducing a design load to a level determined by a static equilibrium. This waiting link 76 can then accommodate for a failure of the primary links 74.

Although a gas turbine engine 20 including geared architecture 48 is described, the waiting link 76 can be employed with a gas turbine engine without a geared architecture.

The foregoing description is only exemplary of the principles of the invention. Many modifications and variations are possible in light of the above teachings. It is, therefore, t be understood that within the scope of the appended claims, the invention may be practiced otherwise than using the example embodiments which have been specifically described. For that reason the following claims should be studied to determine the true scope and content of this invention.

What is claimed is:

1. A waiting link to support an engine on an aircraft, the waiting link comprising:
   a body portion including a first body portion opening, a second body portion opening, and a space located therebetween, wherein the first opening is in communication with the space;
   a first bearing received in the first body portion opening and moveable in a generally vertical direction, wherein the first bearing includes a first bearing opening that receives a first attachment member that secures the body portion to a first structure, wherein the first body portion opening has a first longitudinal axis;
   a second bearing received in the second body portion opening, wherein the second bearing includes a second bearing opening that receives a second attachment member that secures the body portion to a second structure, wherein the second body portion opening has a longitudinal second axis; and
   a cam located in the space, wherein the cam is pivotable about a third axis of rotation between a first position and a second position, wherein the waiting link does not provide a load path when the cam is in the first position, and when a primary load path fails, the waiting link provides the load path when the cam is in the second position, wherein the first longitudinal axis, the second longitudinal axis, and the third axis of rotation are different.

2. The waiting link as recited in claim 1 wherein the first structure is a pylon.

3. The waiting link as recited in claim 1 wherein the second structure is a fan containment case of an engine.

4. The waiting link as recited in claim 1 wherein the first bearing is a first ball bearing and the second bearing is a second ball bearing.

5. The waiting link as recited in claim 1 wherein the first bearing is an upper bearing and the second bearing is a lower bearing.

6. The waiting link as recited in claim 1 wherein the first opening and the space share a common space.

7. The waiting link as recited in claim 1 wherein the cam is substantially rectangular and pivots about a pivot pin.

8. The waiting link as recited in claim 1 wherein the waiting link does not carry a load of an aircraft when the cam is in the first position.

9. The waiting link as recited in claim 1 wherein a gap is defined between a first ball bearing and the cam when the cam is in the first position, and when the cam pivots about the third axis of rotation to the second position, the gap is eliminated, and vertical movement of the engine will not produce impact load.

10. The waiting link as recited in claim 1 including a resilient member that biases the cam to the second position.

11. The waiting link as recited in claim 10 wherein the resilient member biases the cam to the second position when the first bearing moves upwardly.

12. A waiting link to support an engine on an aircraft, the waiting link comprising:
a body portion including a first body portion opening, a second body portion opening, and a space located therebetween, wherein the first opening is in communication with the space;
a first ball bearing received in the first body portion opening and moveable in a generally vertical direction, wherein the first ball bearing includes a first ball bearing opening that receives a first attachment member that secures the body portion to a pylon, and the first ball bearing is an upper bearing, wherein the first body portion opening has a first longitudinal axis;
a second ball bearing received in the second body portion opening, wherein the second ball bearing includes a second ball bearing opening that receives a second attachment member that secures the body portion to a fan containment case of an engine, and the second ball bearing is a lower bearing, wherein the second body portion opening has a second longitudinal axis;
a cam located in the space, wherein the cam is pivotable about a third axis of rotation between a first position and a second position, wherein the waiting link does not provide a load path and does not carry a load of an aircraft when the cam is in the first position, and when a primary load path fails, the waiting link provides the load path when the cam is in the second position, wherein the first longitudinal axis, the second longitudinal axis, and the third axis of rotation are different; and
a resilient member that biases the cam to the second position.

13. The waiting link as recited in claim 12 wherein the first opening and the space share a common space.

14. The waiting link as recited in claim 12 wherein the cam is substantially rectangular and pivots about a pivot pin.

15. The waiting link as recited in claim 12 wherein a gap is defined between a first ball bearing and the cam when the cam is in the first position, and when the cam pivots about the third axis of rotation to the second position, the gap is eliminated, and vertical movement of the engine will not produce impact load.

16. The waiting link as recited in claim 12 wherein, as the first bearing moves upwardly, the resilient member biases the cam to the second position.

17. The waiting link as recited in claim 1 wherein the waiting link carries a load of the second structure.

18. The waiting link as recited in claim 1 wherein a portion of the first bearing is received in a groove on a surface of the cam.

19. The waiting link as recited in claim 12 wherein the waiting link carries a load of the fan containment case.

20. The waiting link as recited in claim 12 wherein a portion of the first bearing is received in a groove on a surface of the cam.

* * * * *